United States Patent [19]

Stringa

[11] 4,163,281
[45] Jul. 31, 1979

[54] METHOD AND APPARATUS FOR THE ROTATION OF A BINARY-DATA MATRIX, INTENDED PARTICULARLY TO BE USED AS A STORAGE UNIT HAVING A TWO-WAY ACCESS MODE FOR ELECTRONIC COMPUTERS

[75] Inventor: Luigi Stringa, Arenzano, Italy

[73] Assignee: Elettronica San Giorgio Elsag S.p.A., Genova-Sestri, Italy

[21] Appl. No.: 837,862

[22] Filed: Sep. 29, 1977

[30] Foreign Application Priority Data

Jun. 30, 1977 [IT] Italy ............................... 25276 A/77

[51] Int. Cl.² ............................................... G06F 7/00
[52] U.S. Cl. ..................................... 364/200; 364/900
[58] Field of Search ... 364/200 MS File, 900 MS File

[56] References Cited

U.S. PATENT DOCUMENTS

| | | | |
|---|---|---|---|
| 3,417,375 | 12/1968 | Packard | 364/200 |
| 3,969,704 | 7/1976 | Liebel, Jr. | 364/900 |

Primary Examiner—Gareth D. Shaw
Assistant Examiner—C. T. Bartz
Attorney, Agent, or Firm—Cushman, Darby & Cushman

[57] ABSTRACT

This invention relates to a method and apparatus for rotating a binary-data matrix, more particularly to a storage unit for computers which allows the matrix to be rotated to obtain row-wise and column-wise access. According to the invention the bits of the binary-data strings which form the rows of the matrix to be rotated are cyclically rotated with a unitary increase of rotation steps between one string and the next one. The rotated strings are parallely written in respective cell rows of a digital memory having individually addressable cells and then parallely read out therefrom by addressing a cell for each column of the memory. There are obtained modified bit strings, which correspond to respective rows of the desired rotated matrix and are subjected to bit rotation to establish the correct bit order in each string.

4 Claims, 9 Drawing Figures

Fig.2

|    | $b_3$ | $b_2$ | $b_1$ | $b_0$ |
|----|-----|-----|-----|-----|
| $W_7$ | 7.3 | 7.2 | 7.1 | 7.0 |
| $W_6$ | 6.3 | 6.2 | 6.1 | 6.0 | ← $M''$
| $W_5$ | 5.3 | 5.2 | 5.1 | 5.0 |
| $W_4$ | 4.3 | 4.2 | 4.1 | 4.0 | ← $M$
| $W_3$ | 3.3 | 3.2 | 3.1 | 3.0 |
| $W_2$ | 2.3 | 2.2 | 2.1 | 2.0 | ← $M'$
| $W_1$ | 1.3 | 1.2 | 1.1 | 1.0 |
| $W_0$ | 0.3 | 0.2 | 0.1 | 0.0 |

Fig.3

|    | $b_3$ | $b_2$ | $b_1$ | $b_0$ |
|----|-----|-----|-----|-----|
| $W'_7$ | 7.0 | 7.3 | 7.2 | 7.1 |
| $W'_6$ | 6.1 | 6.0 | 6.3 | 6.2 |
| $W'_5$ | 5.2 | 5.1 | 5.0 | 5.3 |
| $W'_4$ | 4.3 | 4.2 | 4.1 | 4.0 |
| $W'_3$ | 3.0 | 3.3 | 3.2 | 3.1 |
| $W'_2$ | 2.1 | 2.0 | 2.3 | 2.2 |
| $W'_1$ | 1.2 | 1.1 | 1.0 | 1.3 |
| $W'_0$ | 0.3 | 0.2 | 0.1 | 0.0 |

Fig.4

|    | $b_3$ | $b_2$ | $b_1$ | $b_0$ | ROT |
|----|---|---|---|---|---|
| $W''_7$ | 7 | 6 | 5 | 4 | 0 |
| $W''_6$ | 6 | 5 | 4 | 7 | 1 |
| $W''_5$ | 5 | 4 | 7 | 6 | 2 |
| $W''_4$ | 4 | 7 | 6 | 5 | 3 |
| $W''_3$ | 3 | 2 | 1 | 0 | 0 |
| $W''_2$ | 2 | 1 | 0 | 3 | 1 |
| $W''_1$ | 1 | 0 | 3 | 2 | 2 |
| $W''_0$ | 0 | 3 | 2 | 1 | 3 |

Fig.5

|  | $w_7^r$ | $w_6^r$ | $w_5^r$ | $w_4^r$ |
|---|---|---|---|---|
| $w_7'''$ | 7.0 | 6.0 | 5.0 | 4.0 |
| $w_6'''$ | 7.1 | 6.1 | 5.1 | 4.1 |
| $w_5'''$ | 7.2 | 6.2 | 5.2 | 4.2 |
| $w_4'''$ | 7.3 | 6.3 | 5.3 | 4.3 |
| $w_3'''$ | 3.0 | 2.0 | 1.0 | 0.0 |
| $w_2'''$ | 3.1 | 2.1 | 1.1 | 0.1 |
| $w_1'''$ | 3.2 | 2.2 | 1.2 | 0.2 |
| $w_0'''$ | 3.3 | 2.3 | 1.3 | 0.3 |
|  | $w_3^r$ | $w_2^r$ | $w_1^r$ | $w_0^r$ |

| $w_4^r$ | $w_5^r$ | $w_6^r$ | $w_7^r$ |
|---|---|---|---|
| 4.3 | 5.3 | 6.3 | 7.3 |
| 4.2 | 5.2 | 6.2 | 7.2 |
| 4.1 | 5.1 | 6.1 | 7.1 |
| 4.0 | 5.0 | 6.0 | 7.0 |
| 0.3 | 1.3 | 2.3 | 3.3 |
| 0.2 | 1.2 | 2.2 | 3.2 |
| 0.1 | 1.1 | 2.1 | 3.1 |
| 0.0 | 1.0 | 2.0 | 3.0 |
| $w_0^r$ | $w_1^r$ | $w_2^r$ | $w_3^r$ |

Fig.7

| 6.0 | 5.1 | 4.2 | 7.3 |
|---|---|---|---|
| 5.0 | 4.1 | 7.2 | 6.3 |
| 4.0 | 7.1 | 6.2 | 5.3 |
| 7.0 | 6.1 | 5.2 | 4.3 |
| 2.0 | 1.1 | 0.2 | 3.3 |
| 1.0 | 0.1 | 3.2 | 2.3 |
| 0.0 | 3.1 | 2.2 | 1.3 |
| 3.0 | 2.1 | 1.2 | 0.3 |

Fig.8

| 7.2 | 6.1 | 5.0 | 4.3 |
|---|---|---|---|
| 7.1 | 6.0 | 5.3 | 4.2 |
| 7.0 | 6.3 | 5.2 | 4.1 |
| 7.3 | 6.2 | 5.1 | 4.0 |
| 3.2 | 2.1 | 1.0 | 0.3 |
| 3.1 | 2.0 | 1.3 | 0.2 |
| 3.0 | 2.3 | 1.2 | 0.1 |
| 3.3 | 2.2 | 1.1 | 0.0 |

METHOD AND APPARATUS FOR THE ROTATION OF A BINARY-DATA MATRIX, INTENDED PARTICULARLY TO BE USED AS A STORAGE UNIT HAVING A TWO-WAY ACCESS MODE FOR ELECTRONIC COMPUTERS

BACKGROUND OF THE INVENTION

This invention relates to a method and an apparatus for the rotation of a binary-data matrix, and more particularly to a storage unit for electronic computers which has the property of permitting the rotation of a matrix so as to obtain two different ways of access: row-wise and column-wise.

It is known that a matrix of binary data can be regarded as being composed by a plurality of bit-strings, or bit-words arranged along one or either of the two directions of development (rows and columns) of said matrix.

It is likewise known that, while, as a result of any detection or processing operation a data matrix in the storage unit of a digital computer is available which is formed by bit strings arranged along one or either of said two directions of development, it may likewise become necessary to orient such bit strings along the other direction of development. This is the case, for example, of optical readouts taken through vertical readout windows, which create, after a possible processing, data matrices having bit strings arranged columnwise, which is not ideal for a TV display carried out by horizontal scanning.

It becomes imperative, in such cases, to effect a so-called "matrix rotation," that is to say, to act upon the arrangement of the data stored in matrix form in such a way that the bit strings which were originally arranged along a certain direction of development will eventually be ordered along another direction of development (more particularly from row-wise to column-wise and vice versa).

It is possible, at present, to use several methods and apparatus for carrying out such a rotation, but these means have the defect that they are slow and intricate, unless particularly sophisticated and thus expensive circuitries are resorted to.

Such a problem becomes particularly impressing with the electronic digital computers which must exploit intricate programming techniques requiring very long processing times in order that the data matrices they have available in their storage units may be rotated.

SUMMARY OF THE INVENTION

An object of the present invention is to provide both a method and an implementation, and more particularly a storage unit for electronic computers, capable of carrying out the rotation of a matrix in a very simple and speedy way, while still adopting conventional techniques and circuitry means, which are thus cheap, along with short and quick programs.

Having these objects in view, the method according to the present invention is characterized in that it comprises the steps of the cyclical rotation of the binary-data-string-bits which compose the respective rows of the matrix to be rotated with a unitary increase of rotation steps between one string and its next, the inscription in parallel of said strings with the bits rotated in respective cell rows of a digital memory of the individually addressable cell type, the readout in parallel, as obtained by addressing a cell per each column of said memory, of modified bit strings corresponding to respective rows of the desired rotated matrix, the rotation of the bits of said modified strings until establishing, per each string, the bit order which has been provided for the corresponding row of said rotated matrix.

To reduce said method to constructive practice, the apparatus according to this invention, more particularly a storage unit for electronic computers, is characterized in that it comprises a first bit-rotator adapted to effect a cyclical rotation of the bits of bit strings which compose respective rows of the matrix to be rotated, with a unitary increase of the rotation steps between a string and its next, a digital memory with individually addressable cells for storing said strings with the rotated bits, means for generating write and readout commands for such a memory, an address-modified inserted between an address-generator (for example, the central unit of the computer in which the storage unit is inserted, if this is the application intended for the apparatus according to this invention) and said memory so as to obtain that during the writing stage all the cells of a memory row are addressed for the writing in parallel of one respective string with the rotated bits and in the readout stage a cell is addressed per each memory column for the readout in parallel of a respective modified string corresponding to a respective row of the desired rotated matrix, a second bit rotator adapted to carry out a rotation of the bits of said modified strings until establishing, for each string, the bit order provided for the corresponding row of said rotated matrix.

Substantially, the method and the apparatus according to the present invention are based on the combination of the effects of the bit rotation to which the strings are subjected prior to writing in the memory with the addressing mode provided for the cells of the memory in the readout stage. Said cyclical rotation, in fact, has the consequence of staggering in different columns of the memory the bits which make up a same column of the original matrix, that is, the bits of the columns which is intended to become one row of the rotated matrix. The subsequent readout addressing of a single cell per each memory column can then have the desired result of permitting the parallel readout (by a single access, for example upon a command of a specially provided instruction in a computer, and thus in a minimum time) of all the bits of a modified string which fully corresponds to one row of the rotated matrix, with the exception of the sequential order of the bits, the latter being appropriately modified by the rotation subsequent to the readout operation.

It has thus become possible to effect the rotation of the matrix (for example by interchanging the rows with the columns and vice versa by a 90-degree rotation towards the right or towards the left), while maintaining the processing times very short even using circuitry components and units of conventional make which are thus inexpensive.

It should be noted that the method and the apparatus according to the invention are capable of carrying out the rotation of data matrices of any description. The only limitation is that the matrix to be rotated be formed by one or more modules having the same number (n) of rows and columns, so as to be enabled to carry out the rotation of the matrix module-by-module.

As a rule, thus, the matrix must comprise a number of rows $N = cn$ wherein c is any integer other than zero.

It is also to be noted that, while the present specification referred hereinabove, and so will hereinafter, explicitly, to the processing of bit strings corresponding to matrix rows, nothing changes from a theoretical standpoint if bit strings corresponding to matrix columns are considered. The matter would only be to consider them, upon processing, as columns rather than rows of the rotated matrix.

It can be noted, in addition, that the method according to the invention can be used even when it is desired that pluridimensional matrices be rotated, that is, matrices in which every data is encoded with k equal to, or higher than 2 bits. For each code level (the levels are k in number) there will exist a sub-matrix of the known type. By carrying out the in-parallel rotations of the k submatrices with the method according to the invention, rotation of pluridimensional data can be carried out.

To clarify the issue further, a detailed description will be given hereinafter of both the structure and the way of operation of a possible embodiment of the invention.

BRIEF DESCRIPTION OF THE DRAWINGS

Such a detailed description will be referred, by way of nonlimiting example only, to the accompanying drawings, wherein:

FIG. 3 shows how the data of said matrix are intended to be inscribed in the digital memory after the initial cyclical rotation, FIG. 4 is a graphical showing of the readout addressing logic of said memory, FIG. 5 shows an example of a rotated matrix which can thus be obtained, FIGS. 6, 7 and 8 are further examples of rotated matrices which can be obtained starting from the matrix of FIG. 2.

DESCRIPTION OF THE PREFERRED EMBODIMENT

Figure 1:
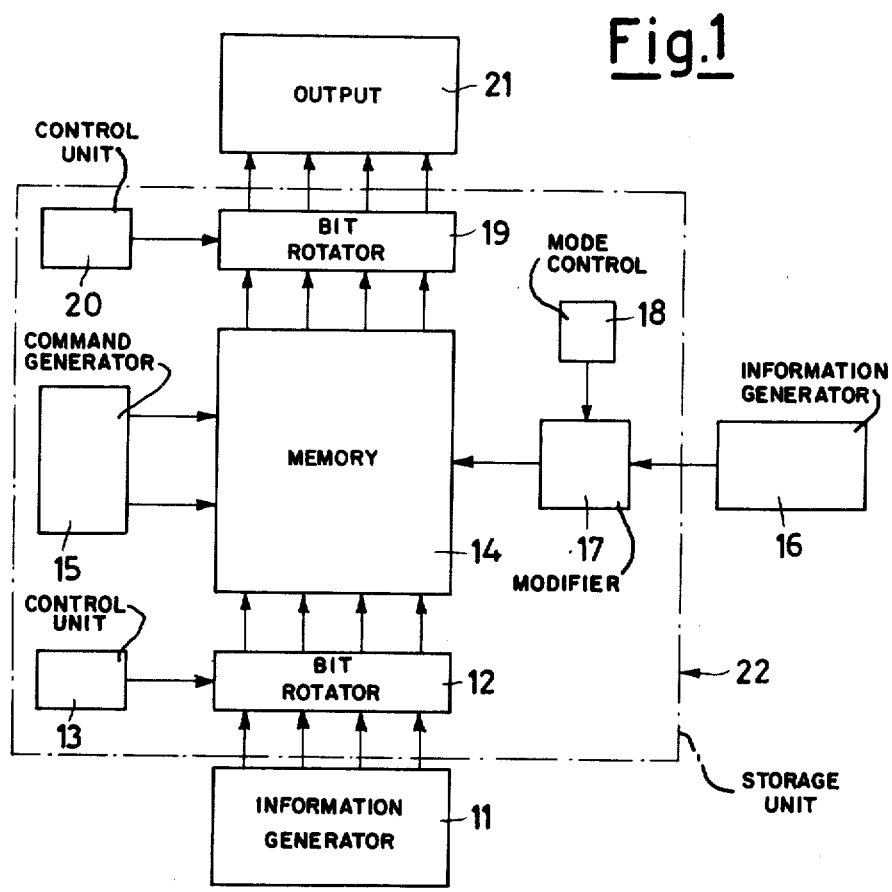
FIG. 1 is an overall block-diagram of a storage unit for electronic computers which embodies the rotation method according to this invention, FIG. 2 gives a graphical example of a binary-data matrix having two modules of four rows and four columns, the rotation of which is to be carried out.

The storage unit diagrammatically shown in FIG. 1, wherein it is generally indicated at 22, generally comprises a first bit-rotator 12, fitted with a control unit 13, to which come the strings which are the rows of the matrix to be rotated and which are generated by the central unit of the computer or another information generator (11), a matrix type digital memory 14 of the type with parallelism 1, that is, with individually addressable cells, a generator of commands of writing and readout 15 associated with the memory 14, a modifier 17 of the addresses which arrive from the central unit of the computer, or from another generator (16) fitted with a mode-control unit 18, and a second bit-rotator 19 fitted with a control unit 20 (to be noted that the two rotators 12 and 19 can physically coincide provided that, when constructed, appropriate circuitry expedients are adopted). The utilizing apparatus for the result of the rotation (21) can still be the central unit of the computer, or another data-processing apparatus.

Assuming that a matrix M is available, having two superposed modules M' and M" with four rows or strings of four bits ($b_0$-$b_3$) each, as shown in FIG. 2, to effect the 90-degree rotation towards the left of each individual module until reaching the rotated array of FIG. 5, the control units 13, 18 and 20 (incorporated into a single general control unit) are acted upon in such a way as to produce the following type of data processing.

The storage unit according to this invention sequentially receives from the central unit of the computer, the eight strings or bit "words" $W_0$-$W_7$ shown in FIG. 2. The matrix to be rotated is thus partitioned into a plurality of bit strings corresponding to respective rows of the same matrix. Properly controlled by the control unit 13, the cyclical rotator 12 effects a cyclical rotation of the bits of each string, care being taken to retain a unitary increase of steps of rotation between one string and the next. More exactly, the string $W_7$ is rotated through three places, the string $W_6$ through two, the string $W_5$ through one, the string $W_3$ through three, the string $W_2$ through two, the string $W_1$ through one and the string $W_0$ through none. Under the control of the write command generator 15 and under the control of the address generator 16 (with the address modifier 17, for example a programmable ROM, in virtually rest conditions) the rotated-bit strings $W_0'$-$W_7'$ issuing from the cyclical rotator 12 are written in corresponding cell rows of the memory 14, so as to originate the temporary configuration as shown in FIG. 3.

By properly controlling the address modifier 17 via the mode-control 18, it becomes now possible to address a cell per each memory column, so as to read out of the same memory in parallel a succession of modified strings $W_0''$-$W_7''$ corresponding to respective rows of the desired rotated matrix M', as formed by two modules M'' and M''' separately rotated through 90 degrees towards the left (FIG. 5). This is obtained, in particular, by addressing the several storage cells in the manner indicated in FIG. 4, that is, by addressing for the string $W_0''$ the bit $b_0$ of the row 1, the bit $b_1$ of the row 2, the bit $b_2$ of the row 3 and the bit $b_3$ of the row 0, for the string $W_1''$ the bit $b_0$ of the row 2, the bit $b_1$ of the row 3, the bit $b_2$ of the row 0 and the bit $b_3$ of the row 1, and so forth.

The results are modified strings $W_0''$-$W_7''$ formed in this way:

| | | | | |
|---|---|---|---|---|
| $W_0''$ = | 0.3 | 3.3 | 2.3 | 1.3 |
| $W_1''$ = | 1.2 | 0.2 | 3.2 | 2.2 |
| $W_2''$ = | 2.1 | 1.1 | 0.1 | 3.1 |
| $W_3''$ = | 3.0 | 2.0 | 1.0 | 0.0 |
| $W_4''$ = | 4.3 | 7.3 | 6.3 | 5.3 |
| $W_5''$ = | 5.2 | 4.2 | 7.2 | 6.2 |
| $W_6''$ = | 6.1 | 5.1 | 4.1 | 7.1 |
| $W_7''$ = | 7.0 | 6.0 | 5.0 | 4.0 |

By the agency of the rotator 19, the bits of said modified strings $W_0''$-$W_7''$ are then subjected to rotation in order to restore the correct bit order, which, for the string $W_0''$ is, for example, 3.3, 2.3, 1.3, 0.3. The number of places of rotation varies cyclically from 0 to 3 in the manner shown in FIG. 4 under the script ROT.

The rotated strings $W_0'''$-$W_7'''$ emerging from the rotator 19 are delivered to the utilizer 21 in the form of corresponding rows of the rotation matrix, the latter having the configuration shown in FIG. 5 and showing the original words $W_0$-$W_7$ ordered column-wise instead of row-wise, of the same matrix (in which they are indicated by the symbols $W_0'-W_7'$).

If so desired, through appropriate changes of the commands impressed onto the rotators 12 and 19 and to the address modifier 17, it is also possible to submit the starting matrix to rotation of different direction and degree, for example through 90° to the right as in FIG. 6 and through 45° to the left, or to the right, as in FIGS. 7 and 8. In view of this fact, it becomes possible to exclude one or either rotator 12 or 19, or both, possibly with the concurrent exclusion of the address modifier 17. By so doing, the apparatus according to the invention can be used for processing operations of the most varied kinds, and under limiting conditions also such as not to provide for rotation of the matrix, or of the bit of the individual strings, either. For the rotations through 45° it is provided, for example, to effect the output rotation only, by excluding the input rotator 12.

It is essential to note that up to now, and hereinafter, explicit reference has been made, and will be, to the performance of the method according to this invention through a storage unit of novel type, which becomes an integral part of a digital computer, which latter, in this way, is enabled to have access in two different ways, namely row-wise or column-wise. However, there is nothing against carrying out the method through an apparatus which is not an integral part of a digital computer, providing that such an apparatus be connected to appropriate generators of information and addresses as well as to utilizers of the so produced information.

While the majority of the logical blocks of FIG. 1, such as for example the address generator 16 (for example the central unit of a computer, the address modifier 17, such as a properly programmed ROM, and so forth, can be regarded, as such, as being well known to those skilled in the art, the same is not true of the cyclical rotators 12 and 19.

Figure 9:
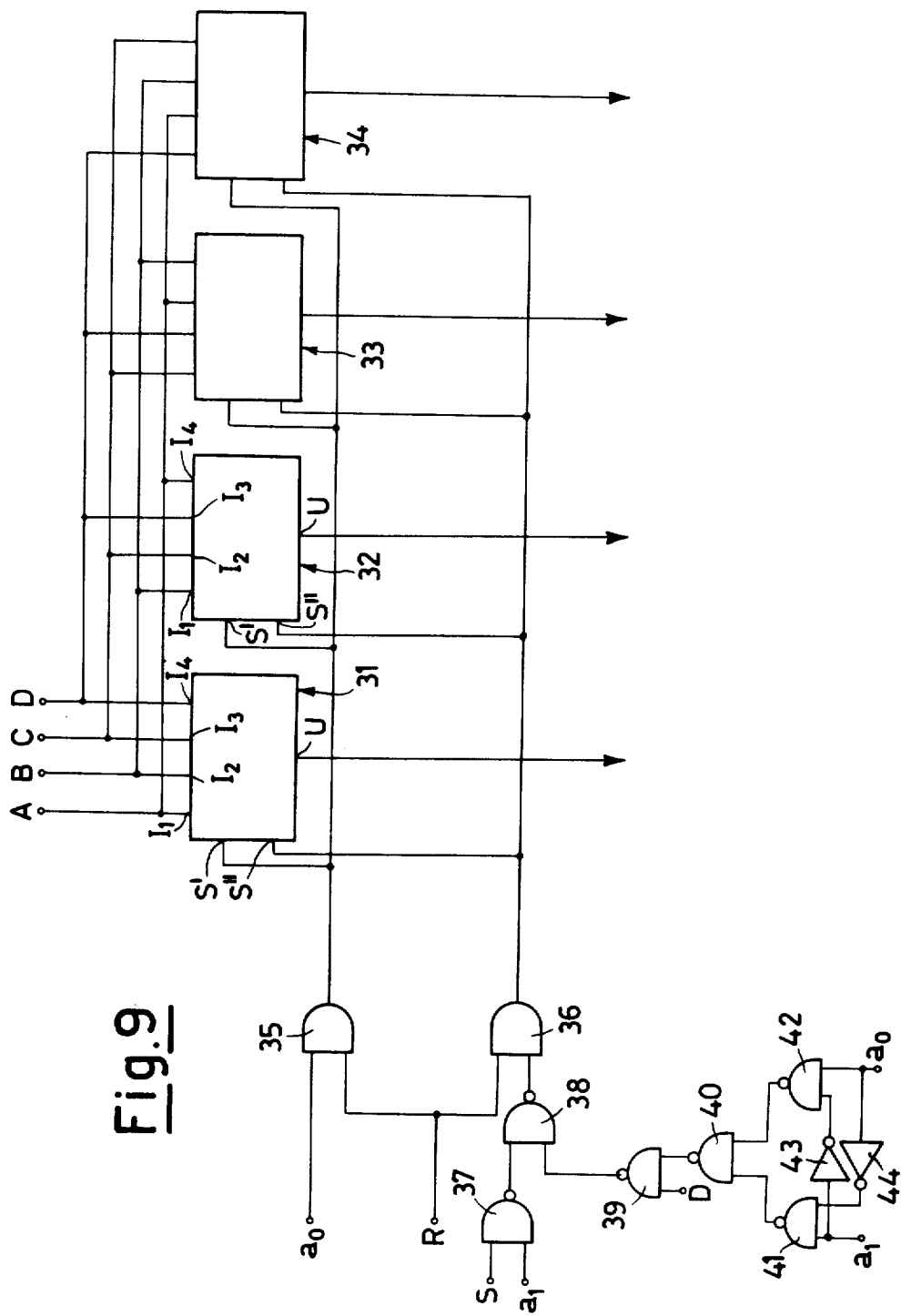
FIG. 9 shows the block diagram of an example of a bit-rotator which can be used for the apparatus according to the present invention.

For the completeness of this disclosure FIG. 9 shows, as described hereinafter by way of nonlimiting example only, a possible embodiment of a rotator which can be used in the apparatus according to the invention.

The rotator shown in FIG. 9 comprises four multiplexers 31-34, each of which has four inputs $I_1-I_4$, which are respectively fed (with an arrangement which is different from a multiplexer to another) with the bits A-D to be subjected to rotation, and a single output U, to which is alternately made available one or either of the input bits as a function of the selection command (this is equal for all the multiplexers) which had been made available to a couple of selection inputs S' and S".

The selection commands for the multiplexers 31-34 is provided by a set of logical elements shown at the left side of FIG. 9 and comprising two AND elements 35 and 36, six NAND elements 37-42 and two inverters 43 and 44. Inputs $a_0-a_1$ are also provided for couples of rotation degree-indicating bits (for example constituted by the two less significant bits of the address signals generated by the address-generator 16 of FIG. 1), two inputs D and S for right- and left- rotation commands (delivered by the control units 13 and 20 of FIG. 1), and an input, R, for a rotation command (likewise delivered by the units 13 and 20).

The mode of operation of the rotator of FIG. 9 is as follows. If the command R has a low logical level, and this means that it is not desired that a rotation be effected, the outputs of the AND elements 35 and 36 are both of a low logical level and the multiplexers 31-34 remain at rest, since their outputs are provided by the same input configuration A B C D. If R and D, or S, are at a high logical level and the command bit combination $a_0, a_1$ is 10, 01 or 11, various combinations of logical levels at the inputs S' and S" are originated and determine corresponding switchings of the multiplexers 31-34 for the production of different output configurations, for example, for left hand rotations BCDA, CDAB and DABC. And thus, from time to time, the desired rotation of the input bits is obtained.

Obviously, many other configurations are possible, both as to logic and circuitry, which can be taken by the rotators used in the apparatus according to the invention.

I claim:

1. A method for rotating a binary-data matrix formed by a plurality of bit strings arranged as respective rows of the matrix, comprising the steps of:
   (a) rotating the bits of each string through a number of bit positions which number of bit positions increases by one from each string to the next string;
   (b) writing in parallel said strings having rotated bits into respective cell rows of a digital memory of the type including rows and columns of individually addressable cells;
   (c) reading out in parallel from said memory modified strings of bits, by addressing one cell of each cell column thereof, each of said modified bit strings including all the bits comprised in a respective row of a desired rotated matrix; and
   (d) rotating the bits of each modified string to arrange the sequence of said bits according to that of said respective row of the rotated matrix.

2. An apparatus for rotating a binary-data matrix formed by a plurality of bit strings arranged as respective rows of the matrix, comprising:
   (a) first bit-rotating means for sequentially receiving said bit strings of the matrix and rotating the bits of each string through a number of bit positions which number of bit positions increases by one from each string to the next string;
   (b) a digital memory including rows and columns of individually addressable cells, a data input of said memory connected to the output of said first bit-rotating means;
   (c) write and readout command generating means associated with said memory for controlling the writing of said strings having rotated bits into said memory and the reading out of modified strings of bits from said memory;
   (d) address generating means associated with said memory for addressing selected cells of said memory;
   (e) an address modifier interposed between said address generating means and said memory;
   (f) mode control means associated with said address modifier for changing the addressing of said memory by said address modifier from a writing condition, in which all the cells of a memory row are simultaneously addressed at any write command to allow parallel writing of said strings having rotated bits in respective cell rows of the memory, to a readout condition, in which one cell of each column is addressed at any readout command to allow parallel readout of said modified strings of bits each including all the bits comprised in a respective row of a desired rotated matrix; and
   (g) second bit-rotating means for sequentially receiving said modified strings from said memory and rotating the bits of each modified string to change the sequence of said bits according to that of said respective row of the rotated matrix.

3. An apparatus according to claim 2, further comprising control means associated with said first and second bit-rotating means and said address modifier for selectively disabling at least one of said first and second rotating means and said address modifier.

4. An apparatus according to claim 2, wherein said apparatus is a storage unit for electronic computers.